Jan. 9, 1945. L. FINE ET AL 2,366,961
TUNNEL SEGMENT AND METHOD OF MAKING SAME
Original Filed July 31, 1940 16 Sheets-Sheet 3
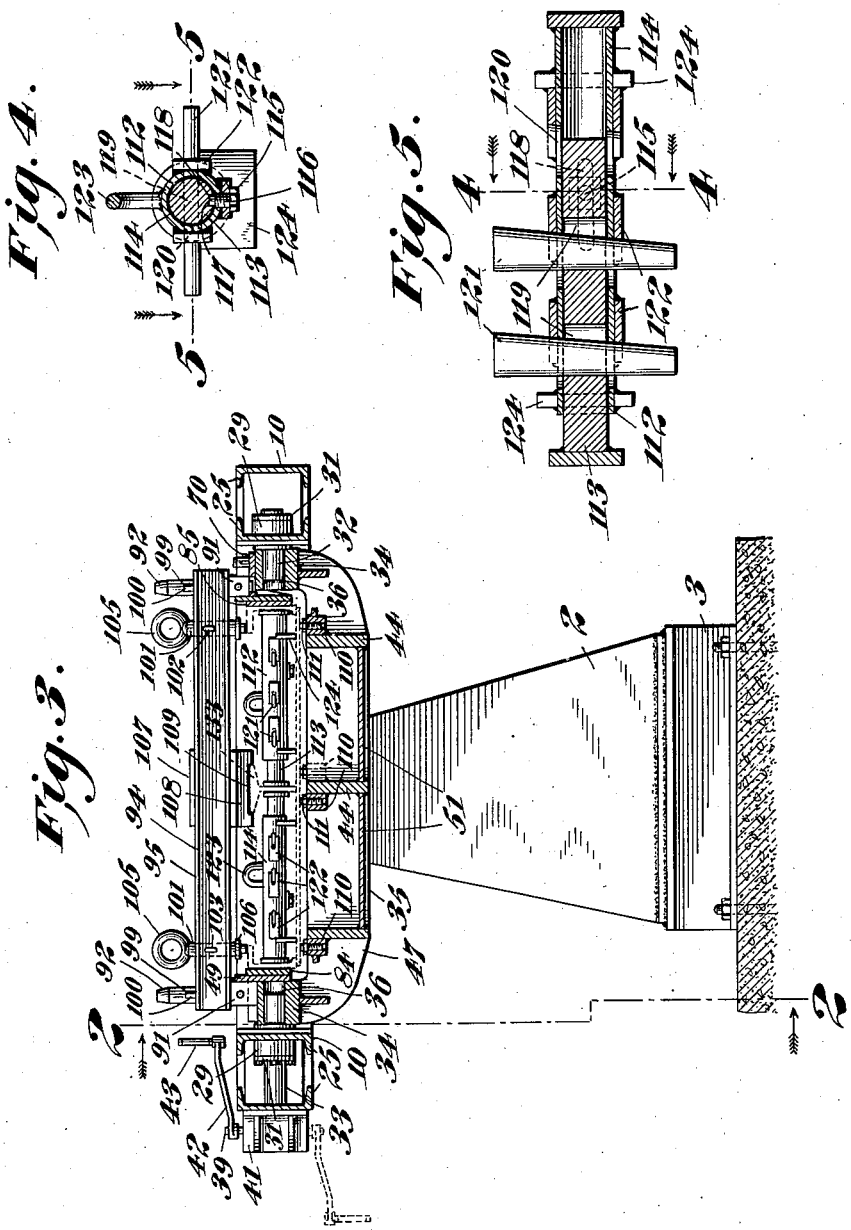
Inventors
*Lewis Fine and
Harley B. Kelchner*
By R. S. C. Dougherty.
Attorney Jan. 9, 1945. L. FINE ET AL 2,366,961
TUNNEL SEGMENT AND METHOD OF MAKING SAME
Original Filed July 31, 1940 16 Sheets-Sheet 4

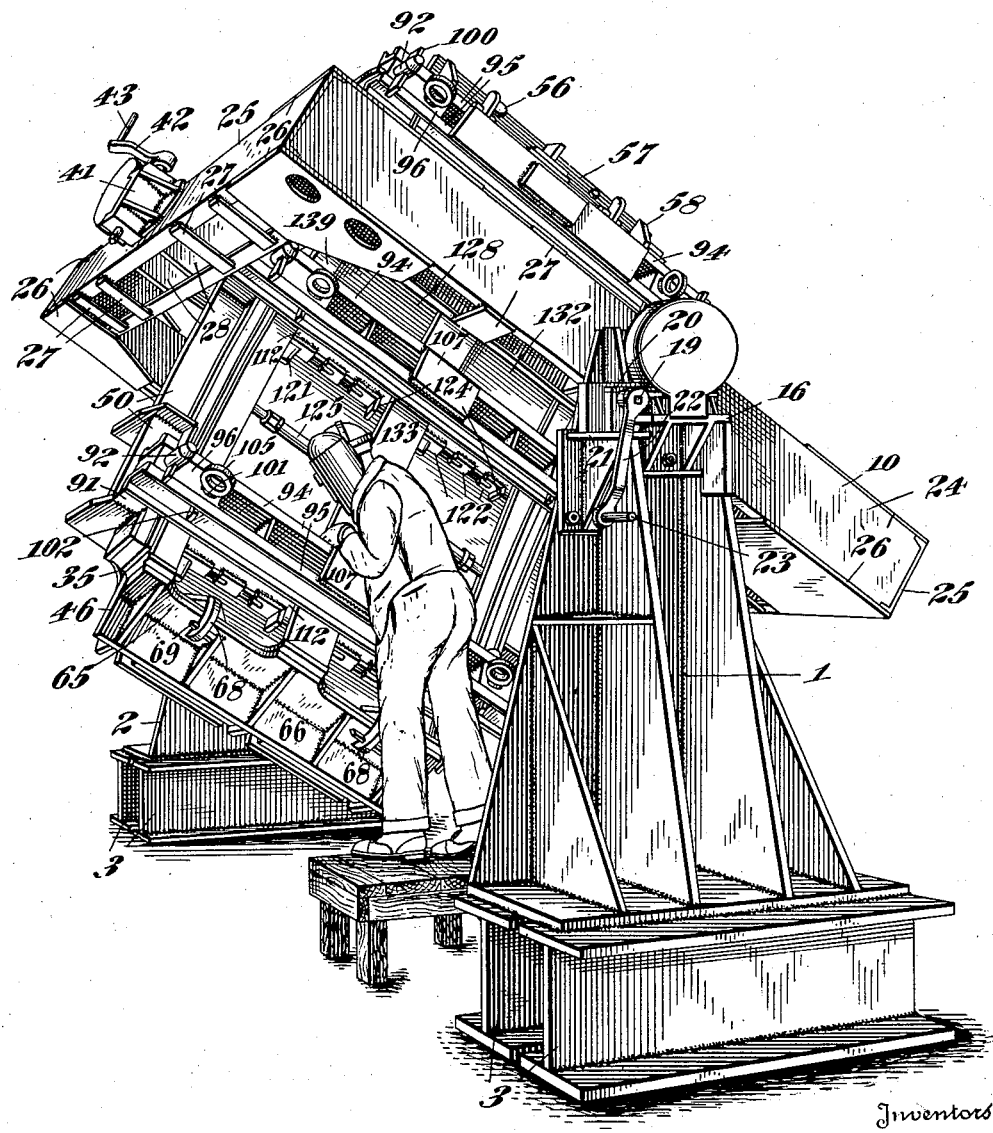

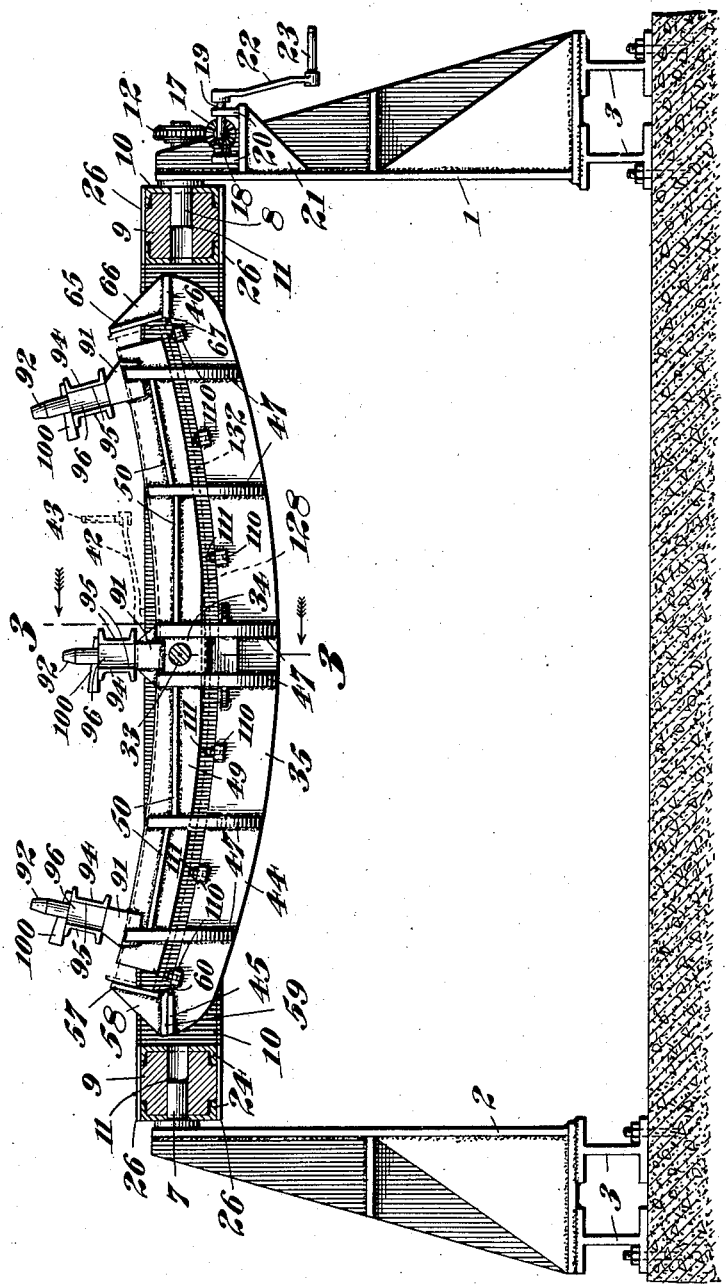

Inventors
*Lewis Fine and
Harley B. Kelchner:*
By R. S. A. Dougherty
Attorney

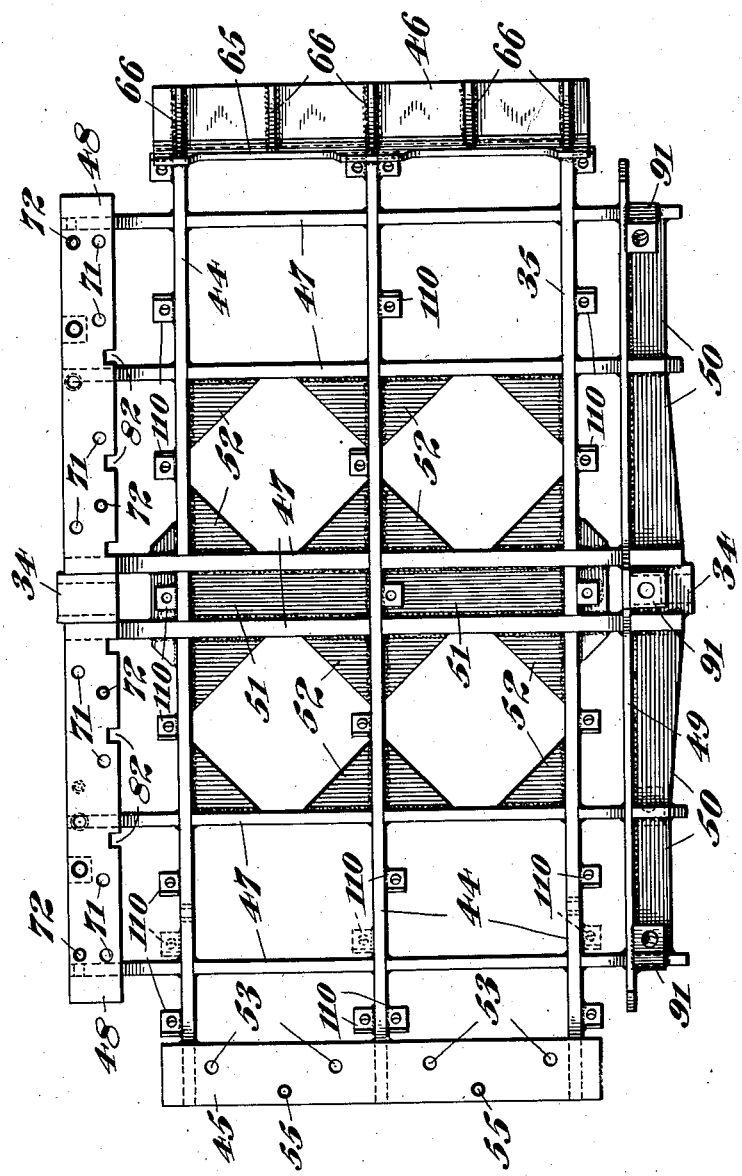

Jan. 9, 1945.  L. FINE ET AL  2,366,961
TUNNEL SEGMENT AND METHOD OF MAKING SAME
Original Filed July 31, 1940   16 Sheets-Sheet 6
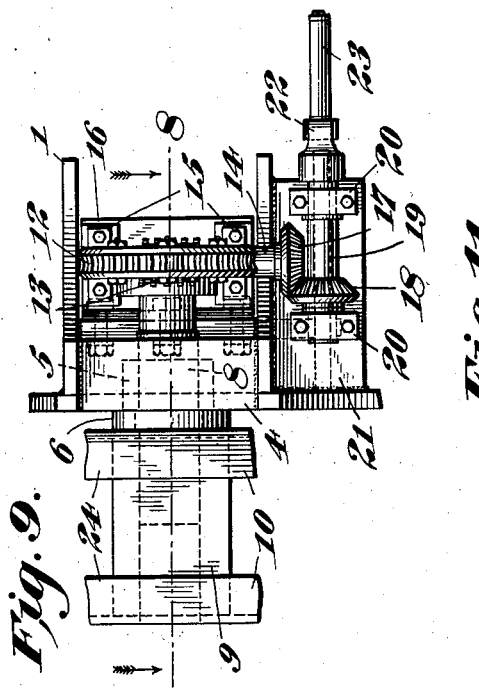
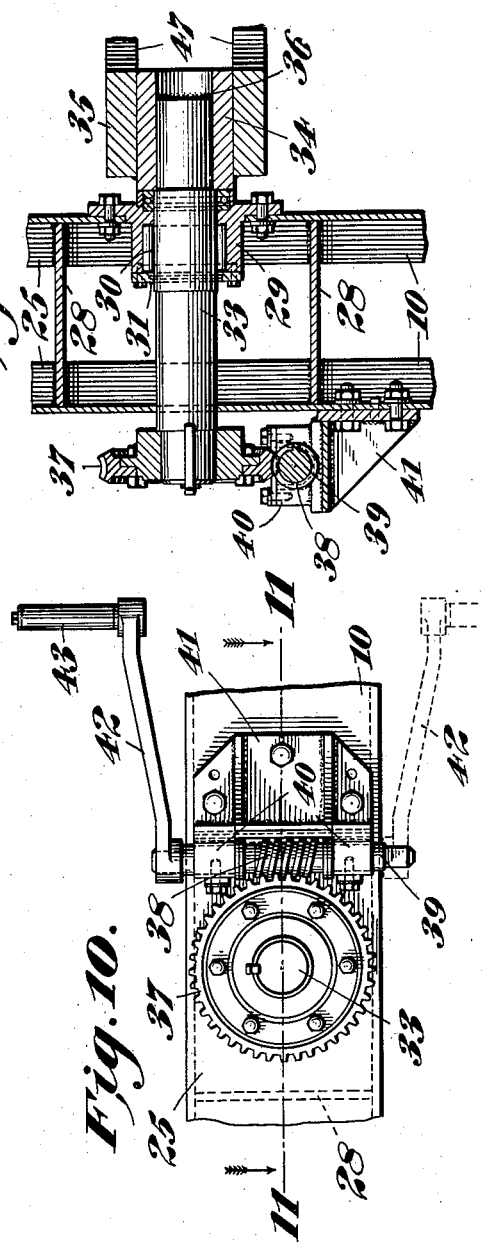
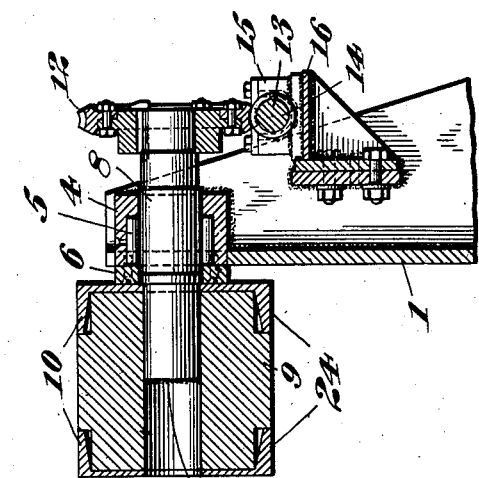
Inventors
*Lewis Fine and
Harley B. Kelchner*
By R. S. A. Dougherty
Attorney Jan. 9, 1945.   L. FINE ET AL   2,366,961
TUNNEL SEGMENT AND METHOD OF MAKING SAME
Original Filed July 31, 1940   16 Sheets-Sheet 7
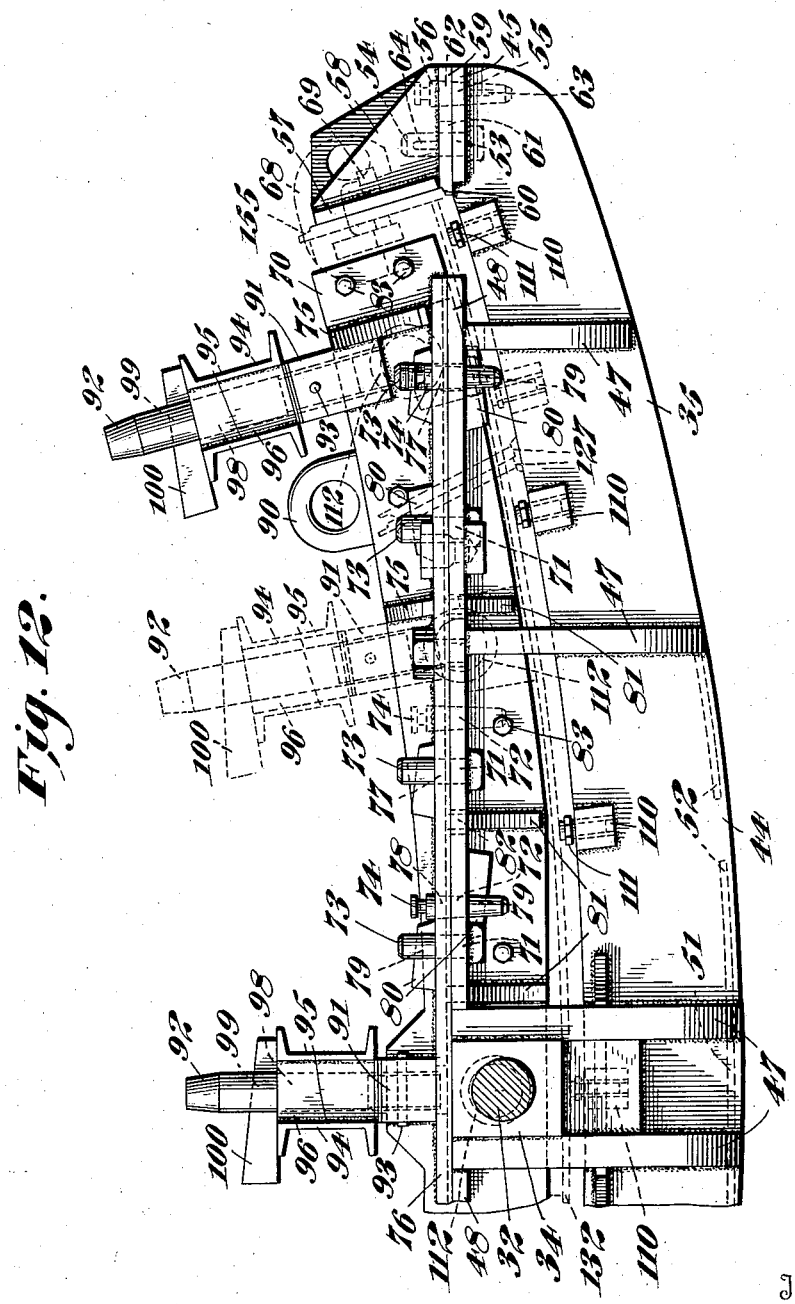
Inventors
*Lewis Fine and
Harley B. Kelchner.*
By *R. S. C. Dougherty*
Attorney Jan. 9, 1945.  L. FINE ET AL  2,366,961
TUNNEL SEGMENT AND METHOD OF MAKING SAME
Original Filed July 31, 1940  16 Sheets-Sheet 8

Inventors
*Lewis Fine and Harley B. Kelchner*
By *R. S. A. Dougherty*
Attorneys

Jan. 9, 1945. L. FINE ET AL 2,366,961
TUNNEL SEGMENT AND METHOD OF MAKING SAME
Original Filed July 31, 1940 16 Sheets-Sheet 9
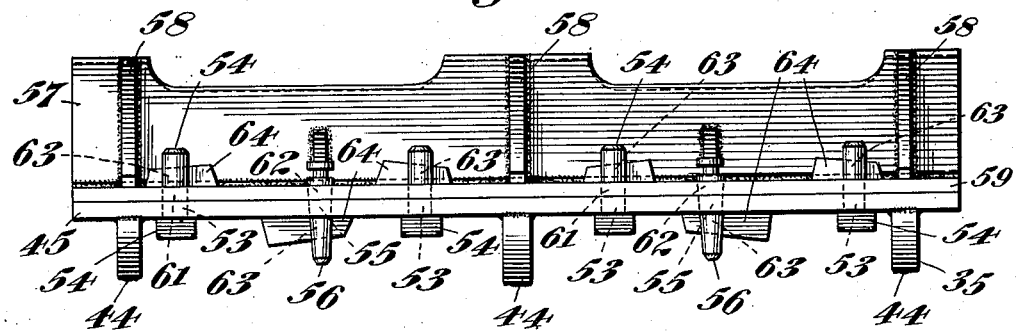
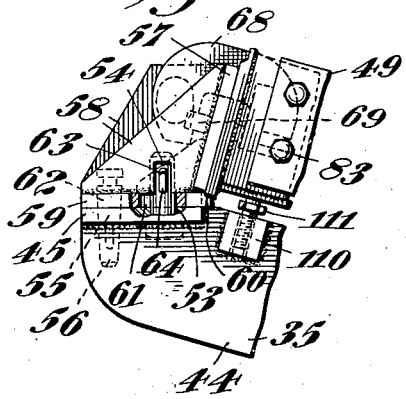 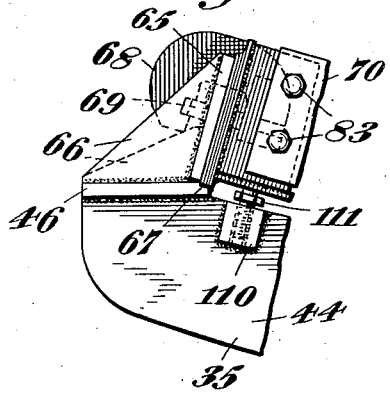
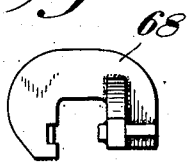 
Inventors
Lewis Fine and
Harley B. Kelchner.
By R. S. A. Dougherty.
Attorney Jan. 9, 1945.   L. FINE ET AL   2,366,961
TUNNEL SEGMENT AND METHOD OF MAKING SAME
Original Filed July 31, 1940   16 Sheets-Sheet 10
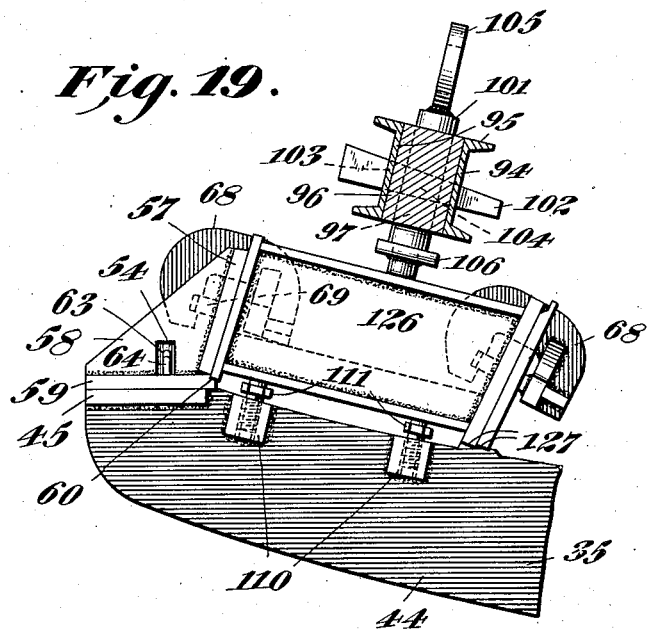
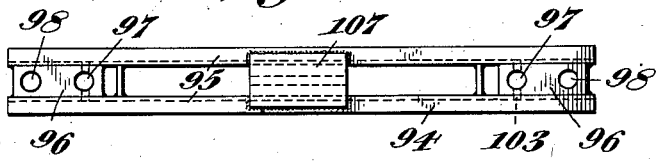
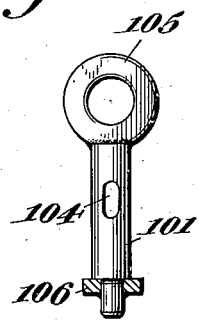
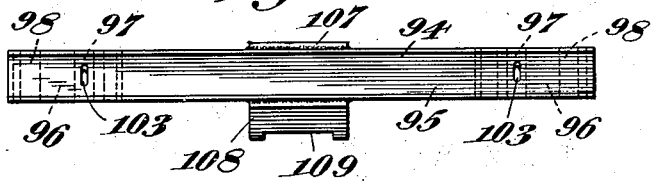
Inventors
Lewis Fine and
Harley B. Kelchner
By R. S. A. Dougherty
Attorney Jan. 9, 1945.  L. FINE ET AL  2,366,961
TUNNEL SEGMENT AND METHOD OF MAKING SAME.
Original Filed July 31, 1940   16 Sheets-Sheet 11
Fig. 23.
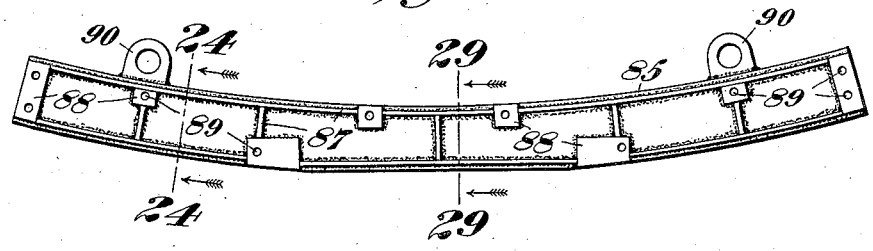
Fig. 24. Fig. 25.   Fig. 27.   Fig. 29.
           Fig. 26.       Fig. 28.
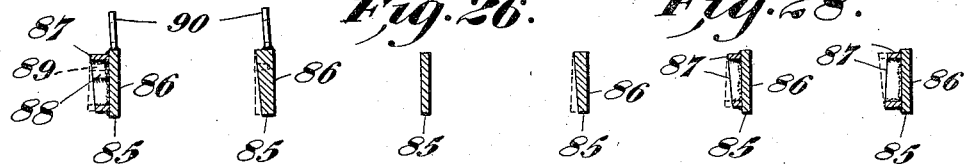
Fig. 30.
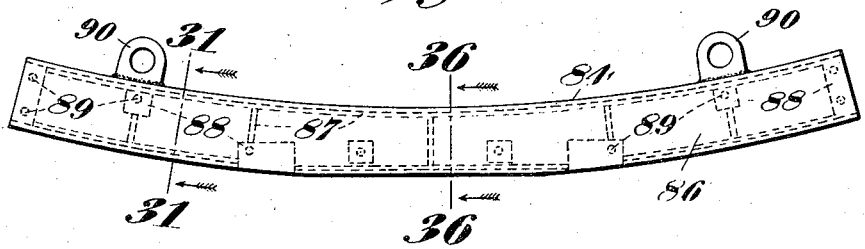
Fig. 31. Fig. 32.   Fig. 34.   Fig. 36.
           Fig. 33.       Fig. 35.
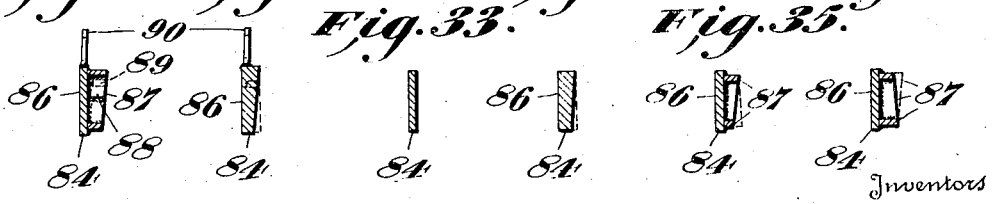
Inventors
Lewis Fine and
Harley B. Kelchner.
By R. S. A. Dougherty.
Attorney Jan. 9, 1945.   L. FINE ET AL   2,366,961
TUNNEL SEGMENT AND METHOD OF MAKING SAME
Original Filed July 31, 1940   16 Sheets-Sheet 12

Inventors
Lewis Fine and
Harley B. Kelchner
By R. S. C. Dougherty
Attorney

Jan. 9, 1945.   L. FINE ET AL   2,366,961
TUNNEL SEGMENT AND METHOD OF MAKING SAME
Original Filed July 31, 1940   16 Sheets-Sheet 13
Fig. 39.
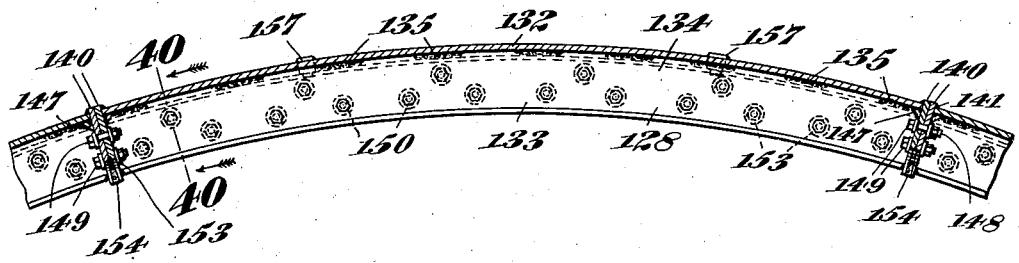
Fig. 40.
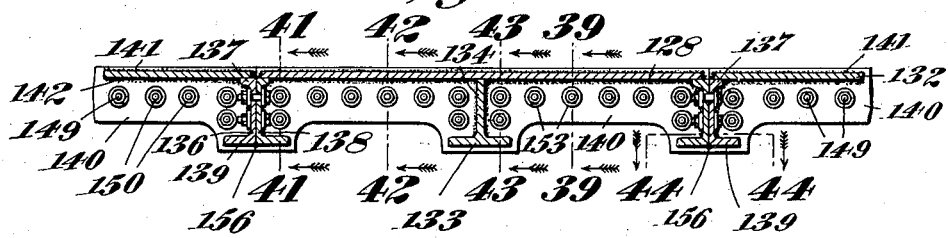
Fig. 41.  Fig. 42.  Fig. 43.
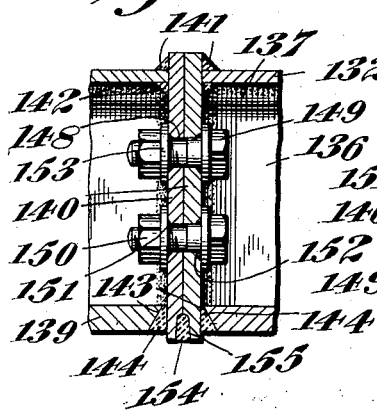 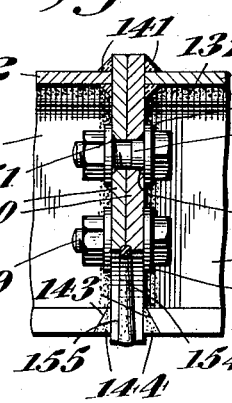 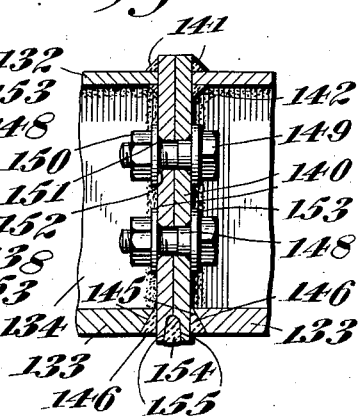
Fig. 44.
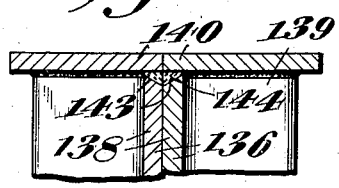
Inventors
Lewis Fine and
Harley B. Kelchner
By R. S. C. Dougherty
Attorney Jan. 9, 1945. L. FINE ET AL 2,366,961
TUNNEL SEGMENT AND METHOD OF MAKING SAME
Original Filed July 31, 1940 16 Sheets-Sheet 14
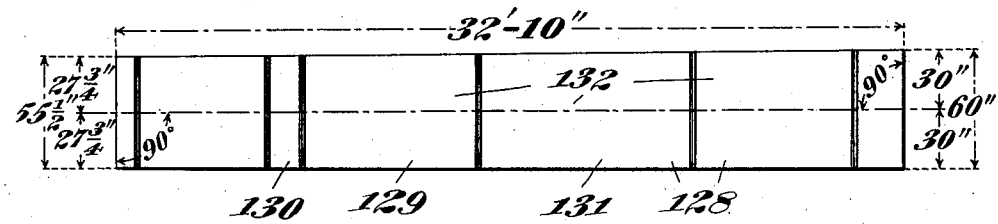
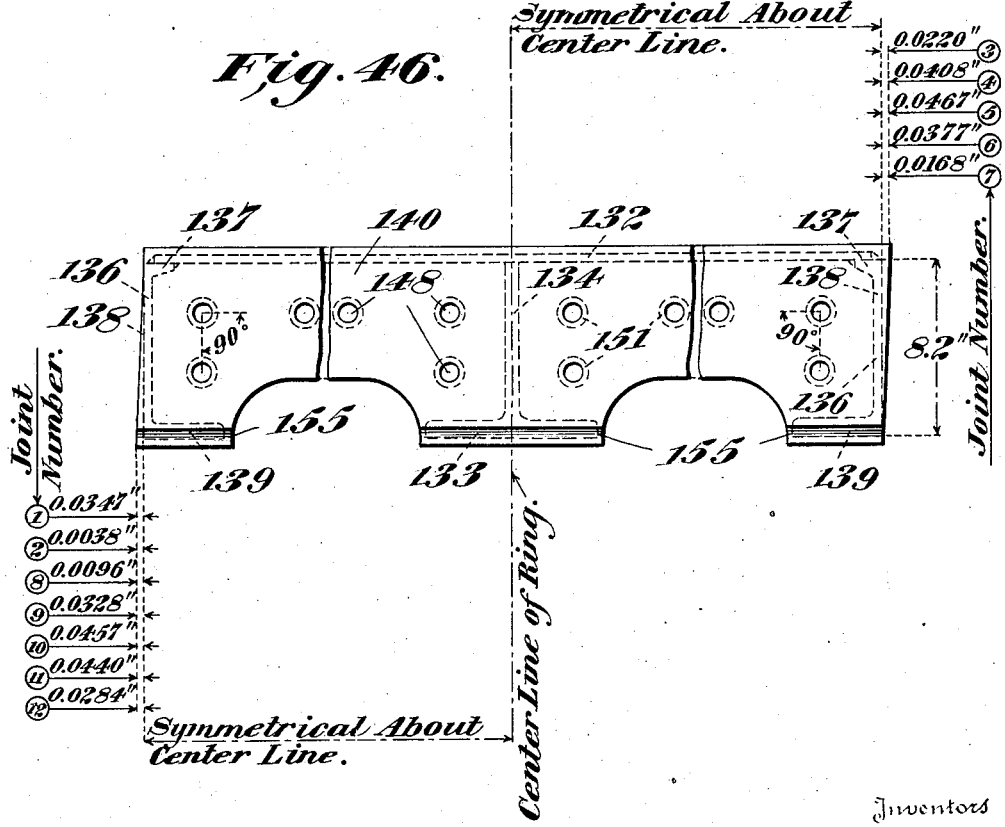
Inventors
Lewis Fine and
Harley B. Kelchner
By R. S. & G. Dougherty
Attorney Inventors
Lewis Fine and
Harley B. Kelchner:
By R. S. A. Dougherty.
Attorney Jan. 9, 1945.　　　　L. FINE ET AL　　　　2,366,961
TUNNEL SEGMENT AND METHOD OF MAKING SAME
Original Filed July 31, 1940　　16 Sheets-Sheet 16

Inventors
Lewis Fine and
Harley B. Kelchner
By R. S. A. Dougherty
Attorney

Patented Jan. 9, 1945

2,366,961

UNITED STATES PATENT OFFICE 2,366,961

TUNNEL SEGMENT AND METHOD OF MAKING SAME

Lewis Fine, Bethlehem, and Harley B. Kelchner, Lower Saucon Township, Northampton County, Pa., assignors to Bethlehem Steel Company, a corporation of Pennsylvania Original application July 31, 1940, Serial No. 348,610. Divided and this application July 25, 1941, Serial No. 404,010

17 Claims. (Cl. 61—45)

This invention relates to the method and apparatus for manufacturing tunnel lining segments of structural steel and is more particularly adapted to the manner of assembling and holding the parts of which the tunnel segments are formed to facilitate welding of the same together to produce a single unit, and is a division of our copending application, Serial No. 348,610, filed July 31, 1940, now Patent No. 2,324,919.

Our invention is especially adapted for use in making tapered tunnel lining segments of structural steel shapes having side and end edge flanges which will have true contact engaging surfaces when the segments and tunnel lining rings are secured together, but it is also adapted for making tunnel segments having parallel side flanges equally as well.

At the present time the usual practice in producing cast tapered segments for constructing curves in tunnels, which is the kind most commonly used heretofore, is to have the segments assembled in a ring on a tapered base ring and horizontally machined on the side flanges of the ring by circular planing or milling. The general practice is to provide the taper on one face only. If it is essential that both faces be tapered, or one half of the taper on each face, the machining operation is performed on both faces with two tapered base rings.

Tapered cast segments have also been produced by planing or milling the side flanged faces of individual segments mounted on correctly calculated base plates all of which requires special castings and machining.

In forming tapered tunnel segments of structural steel shapes or in one piece of plate metal in a press by means of bending dies, the outer side faces of the side flanges of the rings will be 90° to the outer surface of the tunnel lining. This does not give true contact engaging surfaces when the rings are secured together, as the side flanges will engage or heel at the outside or inside diameter of the rings and have a gap at the adjacent surface. If this gap is not too great it can be closed by means of drawing up on the bolts which connect the side flanges together. If, however, the gap exceeds the tolerances allowed it would have to be closed by means of a seal weld, which might be a source of trouble for the contractor.

The importance of this problem has been considered and provided for in various ways in some of the important tunnels built and in some cases in constructing tunnels around curves iron packing has had to be placed between the rings to make the joints radiate properly from the center point of the curve. In other cases special castings have had to be used, and soft wood packing or the like has also been used to some extent.

One of the objects of our invention relates to producing a tunnel segment formed of structural material provided with side and end flanges which have true contact engaging side surfaces.

Another object of our invention relates to the method of forming tunnel lining segments having side and end flanges having true contact engaging side surfaces.

Another object of our invention relates to the method of forming a tapered tunnel lining segment having a skin plate with parallel side edges.

Another object of our invention relates to the method of forming a tunnel lining segment having the side flanges extending parallel to each other with a skin plate of varying width.

Another object of our invention relates to the manner of assembling and clamping the parts of which the segment is formed in a jig having cheek plates with inclined faces adapted to produce the desired inclination of the side flanges of the segment.

Another object of our invention relates to the construction of the jig whereby the cradle with the structural parts of the segment mounted thereon may be rotated at different angles to facilitate the welding operation.

A further object of our invention relates to the manner of assembling and removing the segment from the jig.

With the foregoing and other objects in view, the invention will be more fully described hereinafter, and will be more particularly pointed out in the appended claims.

Referring now to the accompanying sixteen sheets of drawings which form a part of this specification and on which like characters of reference indicate like parts.

Figure 1 is a perspective view of the holding jig;

Figure 2 is a vertical longitudinal section through the holding jig taken on the line 2—2 of Figure 3 with the outside frame in section to show more clearly the trunnion bearings for the same;

Figure 3 is a transverse section through the holding jig taken on the line 3—3 of Figure 2;

Figure 4 is a transverse section through one of the clamping jacks taken on the line 4—4 of Figure 5;

Figure 5 is a longitudinal section through one of the clamping jacks taken on the line 5—5 of Figure 4;

Figure 7 is a top plan view of the cradle;

Figure 8 is a detail section view of the outside frame turning mechanism taken on the line 8—8 of Figure 9;

Figure 9 is a top plan view of the outside frame turning mechanism;

Figure 10 is a front elevation of the cradle turning mechanism;

Figure 11 is a horizontal section through the cradle turning mechanism taken on the line 11—11 of Figure 10;

Figure 12 is a side elevation of a portion of the cradle showing the movable side for the same drawn on an enlarged scale;

Figure 14 is a front elevation of the movable end of the cradle;

Figure 15 is an end elevation of the movable end of the cradle;

Figure 16 is an end elevation of the fixed end of the cradle;

Figure 17 is a side elevation of one of the holding clamps;

Figure 18 is an end elevation of the said clamp;

Figure 19 is a detail showing the false key segment and the manner of holding the same in the cradle;

Figure 20 is a top plan view of one of the hold down beams;

Figure 21 is a side elevation of the hold down beam shown in Figure 20;

Figure 22 is a side elevation of one of the hold down pins;

Figure 23 is a side elevation of the outer side of the fixed side cheek plate;

Figure 24 is a transverse section of the same taken on the line 24—24 of Figure 23 showing a ribbed section;

Figure 25 is a section taken on the same line as Figure 24, but showing a solid section;

Figures 26, 27, 28 and 29 illustrate sections taken on the line 29—29 of Figure 23 showing the different angles of the sides of false cheek plates we may use;

Figure 30 is a side elevation of the inner side of the movable side false cheek plate;

Figure 31 is a transverse section of the same taken on the line 31—31 of Figure 30 showing a ribbed section;

Figure 32 is a section taken on the same line as Figure 31, but showing a solid section;

Figures 33, 34, 35 and 36 illustrate sections taken on the line 36—36 of Figure 30 showing the different angles of the sides of false cheek plates we may use;

Figure 39 is a partial transverse sectional view of the tunnel lining taken on the line 39—39 of Figure 40;

Figure 40 is a longitudinal section view taken on the line 40—40 of Figure 39;

Figure 47:
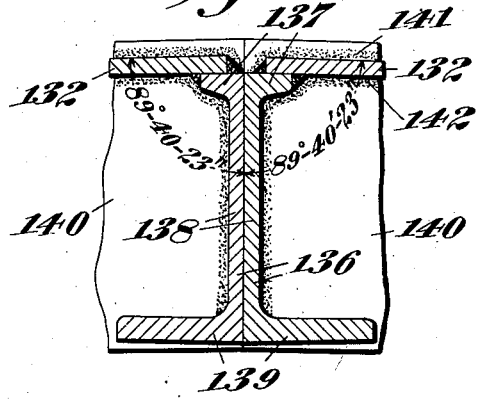
Figure 48:
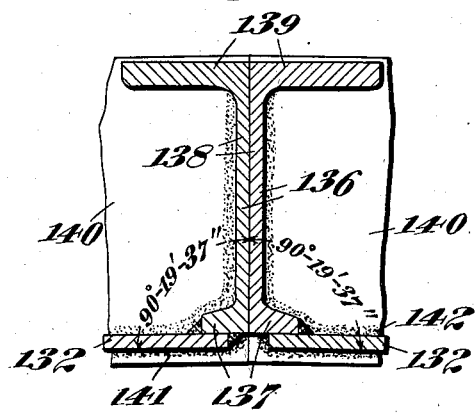
Figure 49:
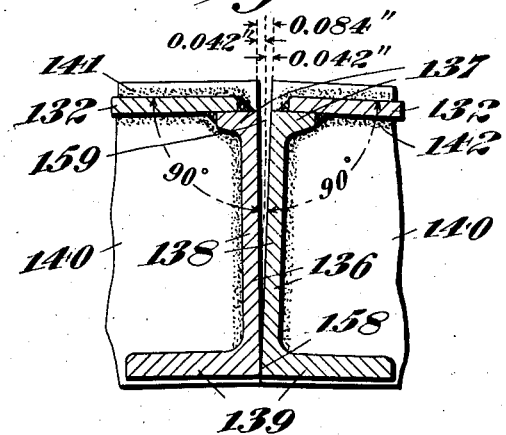
Figure 50:
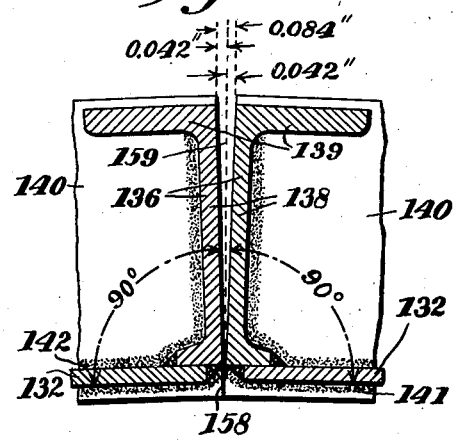
Figure 51:
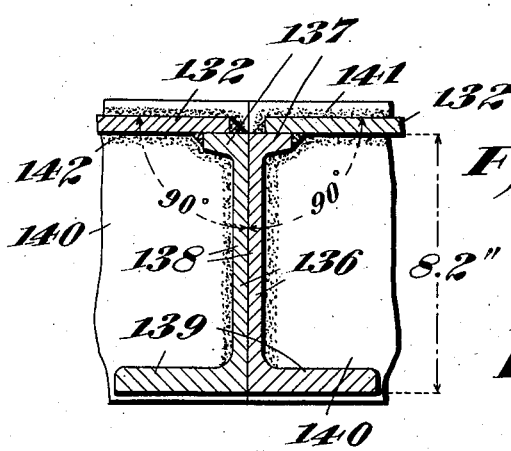
Figure 52:
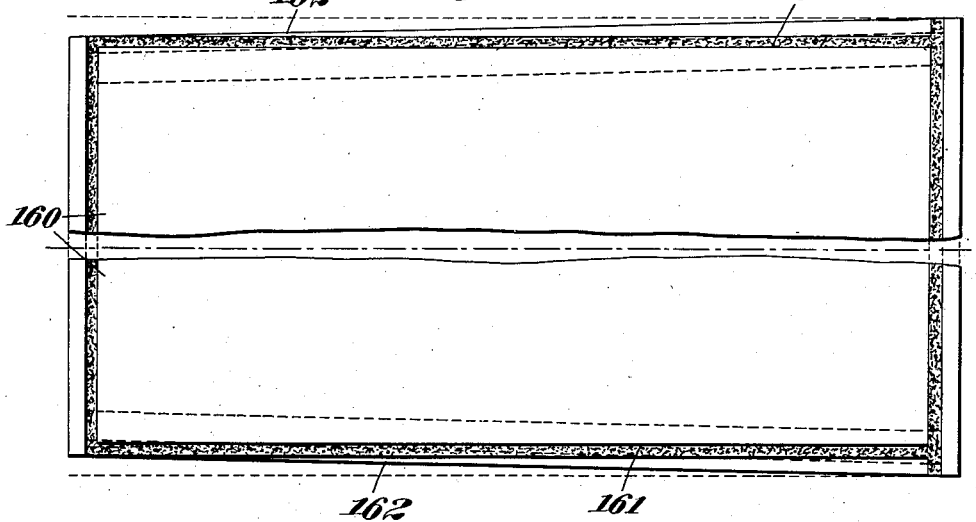
Figure 53:
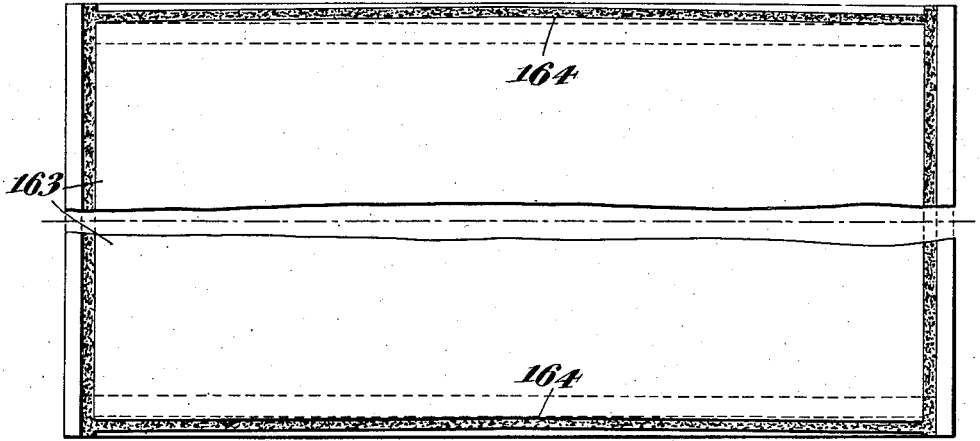

Figures 41, 42, 43 and 44 are detail sections drawn on a larger scale taken on the lines 41—41, 42—42, 43—43, and 44—44, respectively, of Figure 40;

Figure 45 is a side elevation showing a ring for a tunnel lining having a 32'—10" diameter with a 4½" taper;

Figure 46 illustrates the inclination of the sides of the tunnel segments at the meeting ends of each of the segments of the ring shown in Figure 45;

Figure 47 is a detail section through the high side on the horizontal axis of the meeting ends of the flanges of two taper rings made according to our invention having a true fit;

Figure 48 is a detail section through the low side on the horizontal axis of the meeting ends of the flanges of two taper rings made according to our invention having a true fit;

Figures 49 and 50 are detail sections through the high and low sides on the horizontal axis illustrating the condition which occurs when the meeting ends of two rings have their flanges disposed at 90° to the outside of the tunnel lining;

Figure 51 is a detail section through the meeting ends of two tunnel lining rings having parallel side flanges;

Figure 52 illustrates the manner of forming a taper segment by inclining the side bulb angles and using a skin plate of uniform width; and Figure 53 shows a tunnel segment having parallel side flanges and provided with a skin plate formed in a continuous rolling mill without being trimmed; in this manner the plate varies somewhat in width.

Referring now to the various characters of reference on the drawings:

The numerals 1 and 2 indicate the trunnion pedestals for supporting the jig which are formed of metal plates cut into the desired shape and welded together. These trunnion pedestals are each mounted on and welded to base members 3 formed of I-beams.

A bearing block 4 is welded to the upper end of each trunnion pedestal 1 and 2 which are provided with roller bearings 5 held in position by means of a cap washer 6. Trunnions 7 and 8 are journaled in roller bearings 5 each having an inwardly extending end portion inserted in a hole in the trunnion bearing blocks 9 of the outside frame 10 and welded thereto as at 11. The trunnion 8 extends outwardly from the bearing block 4 and has a worm wheel 12 keyed thereto meshing with a worm 13 which has its shaft 14 journaled in bearings 15 mounted on a bracket 16 secured to the upper portion of the trunnion pedestal 2. A beveled pinion 17 is mounted on one end of the shaft 14 of the worm 13 adapted to mesh with a beveled pinion 18 keyed to a shaft 19 journaled in bearings 20 which is mounted on a bracket 21 secured to the upper portion of the trunnion pedestal 2 adjacent to the bracket 16. The outer end of shaft 19 is provided with a crank arm 22 having a handle 23 by means of which the outside frame 10 may be rotated vertically.

This outside frame 10 comprises a rectangular frame formed of spaced channel shaped side and end members 24 and 25, respectively, disposed with their flanges extending inwardly toward each other and connected together at their ends by means of gusset plates 26 and at intermediate points by means of plates 27 and ribs 28.

As indicated more clearly in Figures 3 and 11 a journal bearing 29 is secured centrally to each of the inner channel shaped members of the end frame members 25 of the outside frame 10. These journal bearings 29 are each provided with a roller bearing 30 held in position by means of a cap washer 31. Trunnions 32 and 33 are journaled in the roller bearings 30 each having an inwardly extending end portion inserted in a hole in trunnion bearing blocks 34 of the cradle 35, and welded thereto as at 36, and a thrust bearing is inserted between each of the bearings 29 and the trunnion bearing blocks 34. The trunnion 33 extends outwardly from the journal bearing 29 beyond the side of the outside frame 10 and has a worm wheel 37 keyed thereto meshing with a worm 38 which has its shaft 39 journaled in bearings 40 mounted on a bracket 41 secured to one of the outer channel shaped end members 25 of the outside frame 10. The outer end of the shaft 39 is provided with a crank arm 42 having a handle 43 by means of which the cradle 35 can be rotated at right angles to the rotation of the outside frame 10.

The cradle 35 on which the structural parts of the tunnel segments are assembled and held during the welding operation is preferably built up of a plurality of parts welded together, and comprises arc shaped longitudinally extending spaced sills 44 connected together at their ends by means of flat plates 45 and 46. These longitudinal sills 44 are connected together at spaced intervals by means of transverse sills 47, each having upwardly extending end portions which are connected together at one side of the cradle by means of horizontally disposed plates 48 to which the movable side of the cradle is attached, while the opposite ends of the transverse sills 47 are connected together by means of a vertically extending side plate 49 forming the stationary side wall having horizontally extending reinforcing flanges welded thereto as at 50. The longitudinally and transversely extending sills 44 and 47 are further reinforced and connected at their central and intermediate portions by means of rectangular and gusset plates 51 and 52, respectively. The segment is assembled with the outer portion or skin plate 132 resting on the cradle and the flanges 136 and end plates 140 extending outwardly therefrom. This outer portion is of greater dimension than the outwardly extending ends of the flanges 136 so that to allow the parts of the segment to be assembled and the finished segment to be removed therefrom, one side and end of the cradle has to be movable, and for this purpose the end plate 45 is provided with holes 53 for receiving bolts 54 and tapered perforations 55 for receiving tapered pins 56. The movable end of the cradle 57 is reinforced by means of flanges 58 welded thereto and to a base plate 59 which is seated on the end plate 45 and has a notch at its inner end as at 60 for receiving the lower edge of the end plate 140 of the tunnel segment and said base plate is further provided with slots 61 and tapered perforations 62 which register with the holes 53 and the tapered perforations 55 in the end plate 45 adapted to receive the bolts 54 and the tapered pins 56. These bolts 54 and tapered pins 56 are slotted as at 63 to receive keys 64 for clamping the movable end of the cradle to the end plate 45. The stationary end wall 65 at the opposite end of the cradle is provided with reinforcing flanges 66 and has its lower end welded to the end plate 46 which is provided with a notch 67 at its inner end for receiving the lower edge of the other end plate 140 at the opposite end of the segment.

In order to hold the end plates of the segment securely in position in contact with the end walls of the cradle during the welding operation, clamps 68 are placed over the outer edges of the same and held in position by means of keys 69.

The movable side of the cradle 70 is attached to the horizontally disposed side plates 48 in a similar manner to that of the movable end of the cradle 57. The said side plates 48 have the holes 71 and tapered perforations 72 for receiving bolts 73 and tapered pins 74. This movable side 70 of the cradle is reinforced by means of flanges 75, welded thereto, and has a horizontally extending plate 76 which is seated on the base plate 48, having slots 77 and tapered perforations 78 therein which register with the holes 71 and tapered perforations 72 in the base plates 48 for receiving the bolts 73 and tapered pins 74. These bolts 73 and tapered pins 74 are also slotted as at 79 for receiving keys 80 for clamping the movable side 70 of the cradle to the side plate 48. In order to further reinforce and hold the movable side 70 of the cradle in position it is provided with brackets 81 which extend into notches 82 in the side plate 48.

The stationary and movable side walls 49 and 70 of the cradle are perforated to receive bolts 83 for attaching the cheek plates 84 and 85 thereto. These cheek plates which are more clearly illustrated in Figures 23 to 36, inclusive, are each preferably formed of a plate having one plain side surface 86 for engaging the side flanges 136 of the assembled segment while the other side is formed with ribs 87 and pads 88 having threaded holes formed therein as at 89 for receiving the threaded ends of the bolts 83. As these cheek plates look similar the two centrally disposed pads 88 on the stationary cheek plate 84 are placed in a different position than those on the movable cheek plate 85 in order to more quickly designate the cheek plates in assembling. The cheek plates are further provided with lifting lugs 90 to facilitate movement of the same. As stated above one side of each cheek plate is plain as at 86 with an angle substantially 90° to the edges and is adapted to engage the side flanges 136 of the tunnel segment while the other side of the cheek plates will have an inclination corresponding to the outer face of the side flanges of the segment which may be 90° or the angles indicated in full lines in Figures 24, 25, 27, 28, 29, 31, 32, 34, 35 and 36 to the angle indicated in dotted lines in these figures. The cheek plates may also be made of solid bars as shown in the sections in Figures 25 to 27 and 32 to 34, inclusive.

Threaded nuts 91 are welded to the central and end portions of the stationary and movable sides of the cradle on the center sides of the same at their upper edges. Each of these nuts 91 has a hold down post 92 with its lower end threaded therein which is further secured thereto by means of a pin 93. The nuts 91 attached to one side wall 49 at one side of the cradle are disposed in parallel alignment with the nuts on the opposite side wall 70 and are connected together by means of a hold down beam 94 comprising a pair of spaced channels 95 secured together at each end by means of blocks 96 each having holes 97 and 98 extending therethrough. The holes 98 are adapted to receive the projecting ends of the hold down posts 92 which are slotted as at 99 for receiving keys 100 adapted to clamp the hold down beams 94 in position. The holes 97 each have a hold down pin 101 mounted therein the lower end of which engages the side flange 136 of the segment. These hold down pins are each adjustably held in position by means of keys 102 which extend through slots 103 and 104 in the channels 95 and the hold down pins, respectively.

In order to facilitate the manipulation of the hold down beams 94 the hold down pins 101 are each formed with an eye 105 at the upper end and are further provided with a flange 106 near the lower end to prevent the pins from being detached from the hold down beam. At the central portion of each hold down beam the flanges of the spaced channels 95 at one side are secured together by means of a plate 107 and on the adjacent side the flanges are connected together by means of a clamping block 108 which extends therefrom and has a recess 109 formed therein for engaging the flanges of the central T-shaped reinforcing chord member 133 of the tunnel segment.

The longitudinally extending sills 44 at their upper edges have threaded nuts 110 welded thereto at spaced intervals, in each of which is threaded an adjustable set bolt 111 adapted to engage the outer face of the skin plate 132 of the segment and support the same in the cradle. These set bolts 111 are adjusted in the desired position by means of a template or the like (not shown) and then preferably welded permanently in the adjusted position.

The T-shaped chord member 133 is held centrally and the webs 138 of the special bulb angles forming the side flanges 136 of the segment are clamped securely against the inner plain surface 86 of the cheek plates 84 and 85 by means of a plurality of pairs of jacks 112, each comprising a plunger 113 for engaging the stem 134 of the T-shaped central chord member 133 and a sleeve 114 engaging the web 138 of the special shaped bulb angle. The sleeve 114 is keyed to the plunger 113 by means of a bolt 115 which is threaded as at 116 in a hole in the sleeve and has a reduced plain end 117 extending into a keyway 118 in the plunger. Said plunger and sleeve are slotted as at 119 and 120, respectively, for receiving adjustable wedges 121 for holding the jack 112 in the clamped position. The sleeve is further provided with reinforcing pads 122 welded thereto for backing up the slots and a U-shaped handle or lifting lug 123 and feet 124 adapted to rest on the inner surface of the skin plate 132 of the segment. We may also in some cases use clamping posts in addition to the jacks as indicated at 125 in Figure 1.

The segments are assembled from the inside in forming the tunnel lining rings, and as the outside of the tunnel is of greater diameter than the inside it is necessary to have a key segment which is placed in position after the other segments in the ring have been assembled. This requires that one of the segments engaging the key be made shorter than the other segments with one end plate 140 inclined at a greater angle than the other. As the cradle is adapted to hold assembled parts for segments of longer length it is sometimes necessary to fill in this space in the cradle by means of a false key member 126 as indicated in Figure 19. In this Figure 19 the inner end plate for the false key and the outer end plate for the short segment are seated in notched lugs 127 extending from the upper edge of the longitudinal sills 44 of the cradle.

Figure 6:
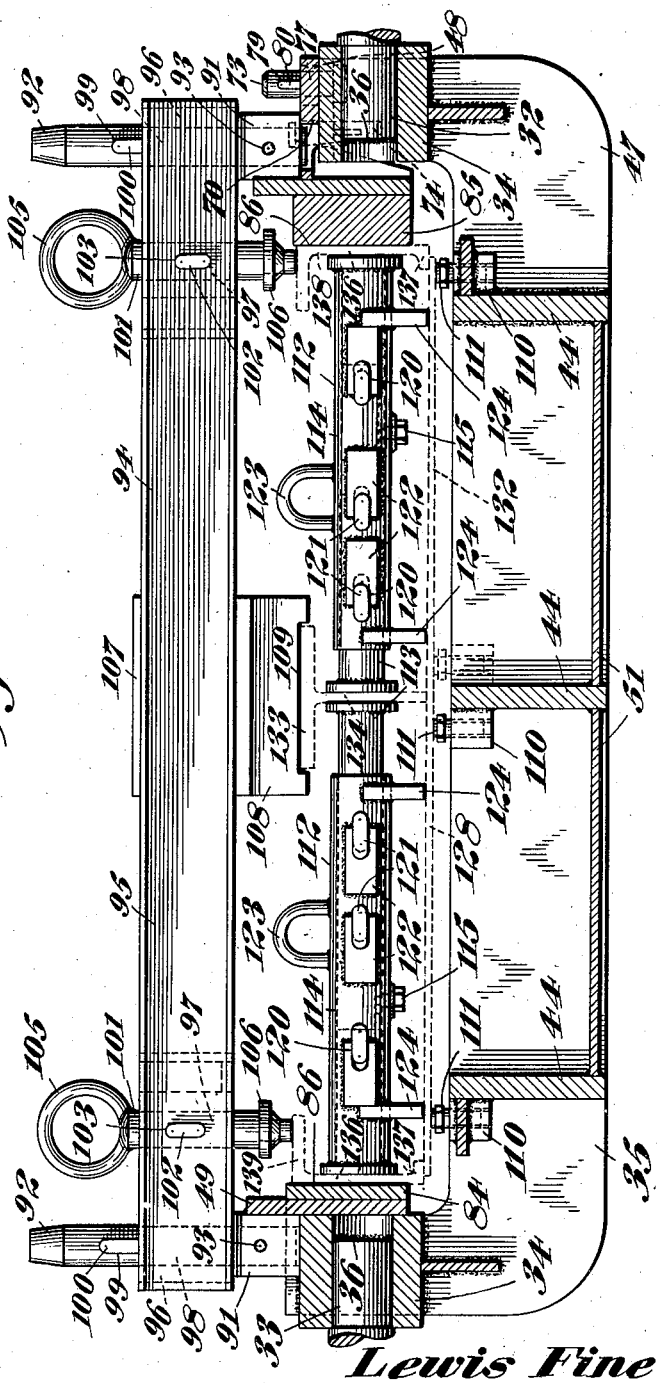
Figure 6 is a transverse section through the cradle taken on the line 3—3 of Figure 2, but drawn on an enlarged scale to show the construction more clearly.
Figure 13:
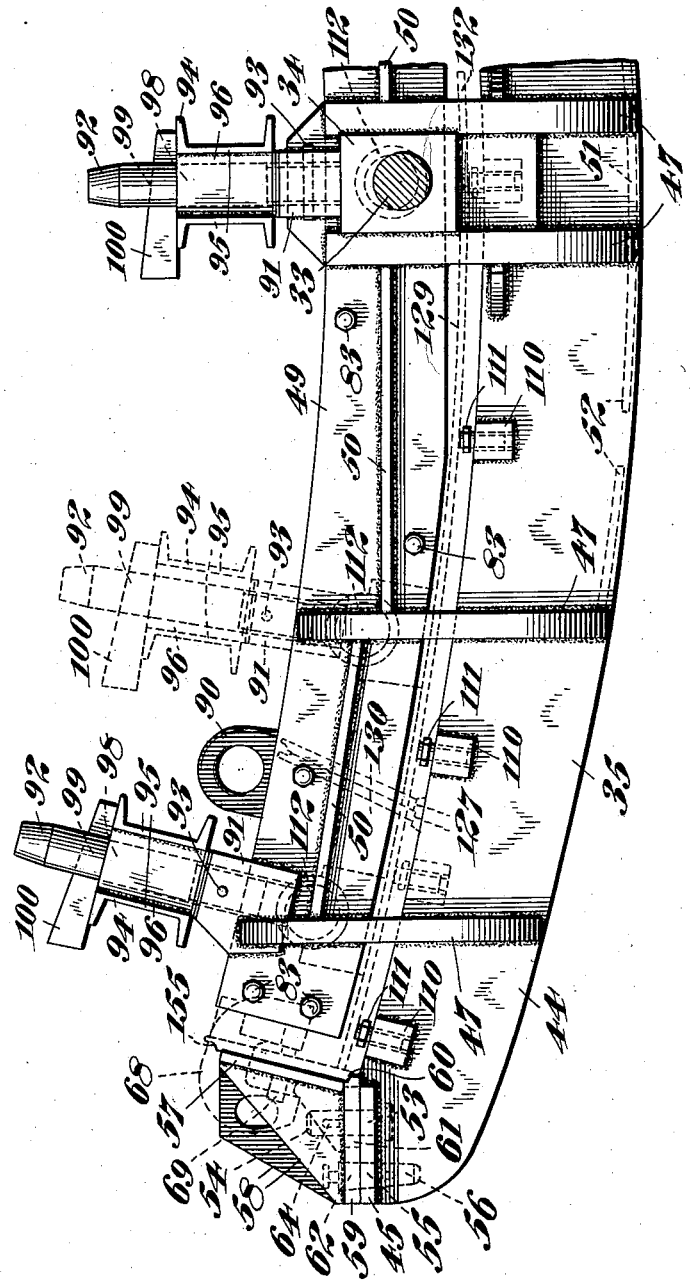
Figure 13 is a side elevation of a portion of the stationary side of the cradle.

We may, however, dispense with this false key member 126 and assemble the short segment and key segment directly together in the cradle in the manner indicated in dotted lines in Figures 12 and 13 of the drawings.

Referring now to Figures 37 to 53, inclusive, 128 indicates the tunnel segments of uniform length, 129 a slightly shorter segment disposed adjacent to the key segment 130, in the tunnel lining rings 131. As indicated in the drawings, each segment comprises an outer skin plate 132, a centrally disposed T-shaped reinforcing chord member 133 having the end of its stem 134 connected by means of intermittent welds 135 and side flanges 136 extending inwardly from the side edges of the skin plate 132, each formed of a bulb angle of special rolled shape having a bulb 137, web 138 and flange 139. The skin plate 132, T-shaped reinforcing chord member 133 and the bulb angles are each cambered to conform to the cylindrical contour of the tunnel lining and have their ends connected together by means of end plates 140, which are of slightly greater height than the depth of the segment. These end plates 140 are secured to the skin plate at the outside and inside of said skin plate 132 by means of continuous welds 141 and 142, respectively, while the ends of the webs 138 and flanges 139 are chamfered as at 143 to receive welding material 144 as indicated in Figures 41, 42 and 44. As shown in Figure 43 the end edges of the flanges of the T-shaped reinforcing chord member are also chamfered at 145 to receive welding material 146, while the end of the stem 134 adjacent to the skin plate is coped to allow the weld 142 to extend continuously therethrough as indicated at 147 in Figure 39. The side flanges 136 and end plates 140 have bolt holes 148 formed therein for receiving bolts 149, each provided with a nut 150 threaded thereon by means of which the segments are connected together. To prevent leakage around these bolts 149, the outer edges of the bolt holes 148 are chamfered as at 151 to receive packing or calking material 152 such as lead or the like, which is held in position by means of washers 153. After each ring of the tunnel lining has been assembled and placed in position the inner edges of the end plates of the segments are welded as at 154, the said edges having grooves 155 formed therein for this purpose as indicated in Figures 39 and 41 to 43, inclusive. The inner edges of the side flanges 136 are also seal welded as at 156 in the manner shown in Figure 40. The segments are further provided with threaded holes in the skin plates 132 to permit grout to be forced through the lining to fill any space around the same after the lining is in place, each of these holes subsequently being closed by a plug 157.

Figure 37:
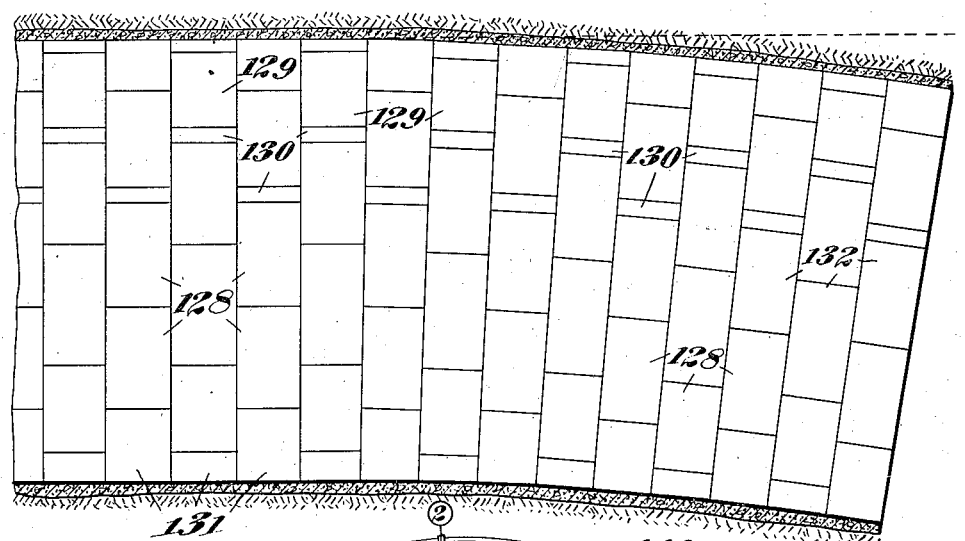
Figure 37 is a side elevation of a portion of a tunnel lining.

If the tunnel lining is straight as illustrated in the left hand side of Figure 37, the side flanges 136 of the segment will be parallel to each other and disposed at an angle of 90° to outer surface of the skin plate 132 and have a true fit as indicated in Figure 51. When the tunnel lining extends around curves or is inclined at an angle to the straight portion of the tunnel lining the segments and rings have to be tapered as indicated in Figure 45 and the right hand side of Figure 37.

If the tunnel segments and rings are tapered and the engaging surfaces of the side flanges are disposed at an angle of 90° which is the usual practice in forming tapered segments for tunnel lining rings, the side flanges at the high and low points of the ring will heel as at 158 at the inner or outside surface of the ring and have a gap 159 at the adjacent surface of the ring in the manner illustrated in Figures 49 and 50.

With our invention we are able to produce tapered segments for a tunnel lining in which the engaging surfaces of the side flanges have a true fit.

In Figures 38 and 45 to 48, inclusive, we have illustrated as an example the manner of constructing a tunnel lining ring 32'—10" in diameter which is 60" wide at the high point, and 55½" wide at the low point thereby producing a tunnel lining having a 4½" taper, with the side flanges of the segments 8⅛" in depth. The contact surfaces of the flanges of the tunnel rings of this size having a 4½" taper should have at the high and low point theoretically the angles indicated in Figures 47 and 48 in relation to the outer surface of the skin plate 132, respectively.

Figure 38:
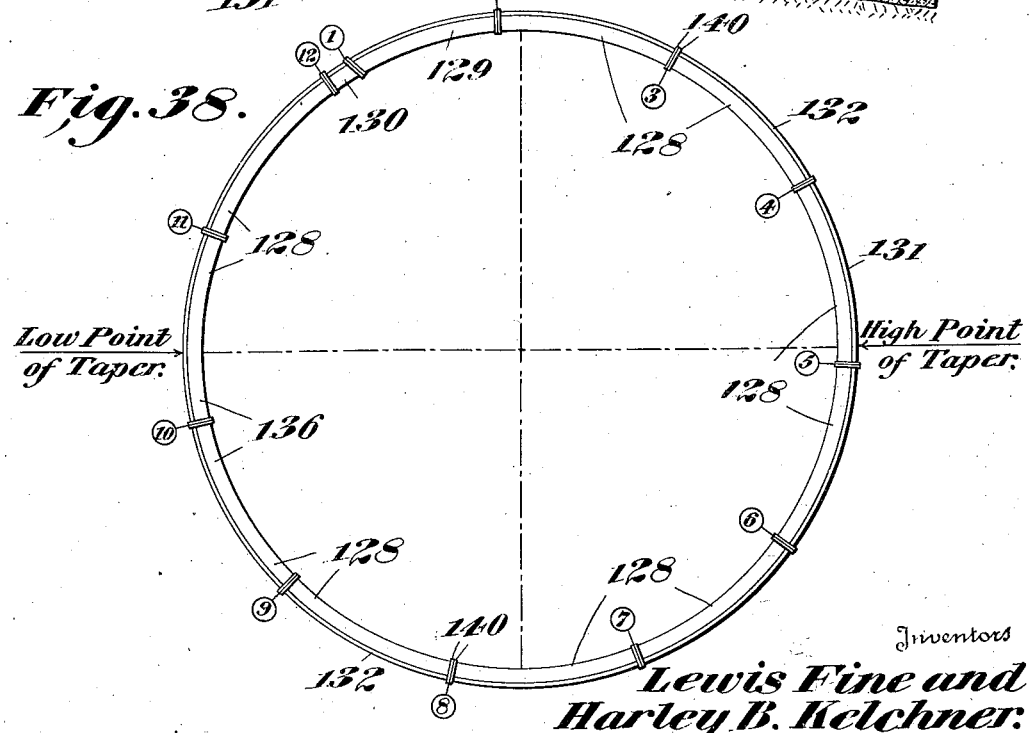
Figure 38 is a diagrammatic end elevation of one of the tunnel rings.

Referring to Figures 38 and 46, it will be noted that in Figure 46, we have indicated theoretically the inclination of the contacting surfaces of the side flanges at the ends of each of the segments in the ring. It will be noted that the greatest inclinations will be at the high and low points of the ring and at right angles thereto the contact surfaces of the side flanges of the rings will always extend at an angle substantially 90° to the outer surface of the skin plate. This is caused by the fact that the side flanges at the high point of the ring if they are disposed 90° or at right angles to the outer surface of the skin plates will extend outwardly from the inclined edges of the skin plates for half of the ring, while the side flanges on the other half of the ring from the low point will extend inwardly thereof.

It will be understood that the dimensions given in Figures 45 to 48, inclusive, are for a tunnel ring of this size having a 4½" taper and that these dimensions would vary comparatively for tunnel rings having a greater or less taper.

In Figure 38 the tunnel ring is disposed for a tunnel lining having a horizontal curve or inclination and the contact surfaces of the side flanges of the rings would extend at an angle of 90° on the vertical plane. If the curved angle of the tunnel lining extended vertically this angle of the contact surfaces of the side flanges would be reversed.

In Figure 52 we have illustrated a method of constructing tapered segments made with a skin plate 160 having parallel side edges 161 with the adjacent ends of the pair of bulb angles 162 which form the side flanges inclined inwardly toward each other, and in Figure 53 we have shown another method of forming tunnel segments having parallel side flanges with a skin plate 163 having a varying width or side edges 164 which has been formed in a continuous rolling mill and used without trimming the side edges thereby saving time and labor.

Having thus given a detailed description of our invention we will now describe the manner of assembling and holding the parts in forming the segment on the jig and the manipulation of the jig during the welding operation: Assuming that the cradle 35 of the jig is in the horizontal position indicated in Figures 2 and 3 and the hold down beams 94 and jacks 112 removed, and the parts of which the tunnel segment is constructed having been cut and formed in the desired shape. The skin plate 132 is first placed in the cradle 35 with the convex surface engaging the top ends of the set bolts 111. The bulb angles forming the side flanges 136 of the segment are then disposed with the bulbs 137 engaging the inner side edges of the skin plate, the webs 138 vertically adjacent to the plain surface 86 of the cheek plates 84 and 85 and the flanges 139 extending inwardly toward each other. The central T-shaped chord member 133 is then placed in position with the end of the stem 134 in contact with the inner surface of the skin plate 132. The jacks 112 are then inserted in position with their feet 124 resting on the inner surface of the skin plate. As illustrated in the drawings three pairs of jacks are used, but a greater or less number may be used if required; each pair is arranged in alignment with each other with the ends of their plungers 113 engaging opposite sides of the stem 134 of the T-shaped chord member 133 and the ends of the sleeves 114 engaging the webs 138 of the bulb angles. The wedges 121 are then driven in place through the slots 119 and 120 thereby clamping the webs 138 of the bulb angles firmly against the sides of the plain surfaces 86 of the cheek plates 84 and 85, and thereby holding the T-shaped chord member 133 in the desired spaced relation. The hold down beams 94 are then mounted in position on the hold down posts 92 and the keys 100 driven tightly into the slots 99 of said hold down posts. The lower ends of the hold down pins 101 will then engage the flanges 139 of the bulb angles and the clamping block 108 will engage the flanges of the T-shaped central chord thereby holding these members securely against the inner surface of the skin plate 132. The end plates 140 are then inserted in place and securely held by means of the clamps 68 and the keys 69. In this manner the assembled parts of the segment are securely held in the desired position and are now ready for the welding operation. In order to facilitate the welding operation the cradle 35 has to be tilted at different angles which is accomplished by the operator rotating the crank arm 22 by means of the handle 23, this will rotate the outside frame 10 and simultaneously the cradle 35 on a horizontal axis and tilt them vertically into any inclined position and by rotating the crank arm 42 by means of the handle 43 the operator can rotate the cradle 35 independently of the movement of the outside frame 10 and at right angles thereto.

After the welding operation the hold down beams 94 are removed by taking out the keys 100 in the hold down posts 92 which will allow them to be lifted off. The jacks 112 and clamps 68 are then removed by taking out the wedges 121 and keys 69. The tapered pins 56 and 74 for the movable end and side of the cradle are now removed and the keys 64 and 80 for securing the bolts 54 and 73 loosened to allow the movable end and side of the cradle to be slid outwardly until the inner ends of the slots 61 and 77 engage the bolts 54 and 73, respectively. The completed segment can then be lifted out of the cradle by means of a crane or the like. The movable side and end of the cradle are then slid back into the original position and again clamped in position by means of the bolts and tapered pins and keys and the assembling clamping and welding operation repeated as above described.

Although we have shown and described our invention in considerable detail, we do not wish it to be limited to the exact construction shown and described, but may use such substitutions, modifications or equivalents thereof, as are embraced within the scope of our invention, or as pointed out in the claims.

Having thus described our invention what we claim as new and desire to secure by Letters Patent is:

1. A tunnel lining segment formed of structural steel shapes with side and end edge flanges having true contact engaging surfaces when the segments and tunnel lining rings are secured together, comprising a skin plate, side flanges each formed of a bulb angle having its bulb attached to one of the inner side edges of the skin plate and the web of each bulb angle extending inwardly therefrom the full length of the segment with the outer contact engaging surfaces extending radially to the center line of the tunnel, flanges at the inner edge of the web of each bulb angle extending toward each other, a T-shaped reinforcing member the same depth of the side flanges having the end of its stem secured centrally between the side flanges to the inner surface of the skin plate and its flanges in parallel alignment with the flanges at the inner edges of the bulb angles, and end plates welded to the ends of said members at the opposite ends of the segment.

2. A tunnel lining segment formed of structural steel shapes with side and end edge flanges having true contact engaging surfaces when the segments and tunnel lining rings are secured together, comprising a skin plate, a side bar of angular cross section secured to the inner surface of the skin plate at its opposite side edges, said side bars each having a web with its outer contact engaging surfaces extending radially to the center line of the tunnel, flanges extending inwardly toward each other from the inner edges of said webs, a centrally disposed longitudinally extending T-shaped reinforcing bar the depth of the side bars having the end of its stem welded to the inner surface of the skin plate and its flanges in parallel alignment with the flanges of the side bars, end plates of greater depth than the segment welded to the ends of said members at the opposite ends of the segment, and a welding groove formed in the inner marginal edge of each end plate.

3. A tapered segment for a tunnel lining or the like formed of structural steel shapes with side and end edge flanges having true contact engaging surfaces when the segments and tunnel lining rings are secured together, comprising a skin plate, side flanges each formed of a rolled bar of angular cross section attached to the inner side edges of the skin plate and extending inwardly therefrom disposed with their outer surfaces in radial alignment to the center line of the tunnel and at varying inclinations for engagement with the outer surfaces of side flanges of adjacently disposed segments having similar inclinations, and an end plate connecting each end of the skin plate and side flanges together.

4. A tapered segment for a tunnel lining or the like formed of structural shapes welded together with side and end edge flanges having true contact engaging surfaces when the segments and tunnel lining rings are secured together, comprising a skin plate longitudinally tapered, side flanges each formed of a bulb angle attached to the inner side edges of the skin plate and extending inwardly therefrom and disposed with the outer surfaces of their webs in radial alignment to the center line of the tunnel and at varying inclinations for engagement with the outer surfaces of side flanges of adjacently disposed segments having similar varying inclinations, said bulb angles at the sides of the segment having flanges extending inwardly toward each other, a reinforcing member the same depth as the side flanges disposed centrally between the side flanges and welded to the inner surface of the skin plate, and end plates welded to the ends of the said members at the opposite ends of the segment.

5. A tapered segment for a tunnel lining or the like formed of rolled structural shapes welded together with side and end edge flanges having true contact engaging surfaces when the segments and tunnel lining rings are secured together, comprising a skin plate longitudinally tapered, side flanges each formed of a bulb angle having its bulb attached to the inner side edges of the skin plate and the web extending inwardly therefrom in radial alignment to the center line of the tunnel and with the outer surfaces of their webs disposed at varying inclinations for engagement with the outer surfaces of side flanges of adjacently disposed segments having similar varying inclinations, a T-shaped reinforcing member the same depth as the side flanges having the ends of its stem secured centrally between the side flanges to the inner surface of the skin plate, and end plates welded to the ends of said members at the opposite ends of the segment.

6. A tapered segment for a tunnel lining or the like formed of rolled structural shapes welded together with side and end edge flanges having true contact engaging surfaces when the segments and tunnel lining rings are secured together, comprising a skin plate longitudinally tapered, side flanges each formed of a bulb angle having its bulb attached to the inner side edge of the skin plate and the web extending inwardly therefrom in radial alignment to the center line of the tunnel and disposed with the outer surfaces of their webs at varying inclinations for engagement with the outer surfaces of the side flanges of adjacently disposed segments having similar varying inclinations, flanges at the inner edges of the web of each bulb angle extending toward each other, a T-shaped reinforcing member the depth of the side flanges having the end of its stem secured centrally between the side flanges to the inner surface of the skin plate and its flanges extending in parallel alignment with the bulb angles, and end plates welded to the ends of said members at the opposite ends of the segment.

7. A tunnel lining formed of rolled structural shapes cut into the desired form and welded together with side and end edge flanges having true contact engaging surfaces when the segments and tunnel lining rings are secured together, comprising a plurality of tapered juxtaposed rings each formed of a plurality of tapered segments having a skin plate with flanged side and end engaging surfaces extending radially to the center line of the tunnel, said flanged sides disposed at varying inclinations for engagement with the outer surfaces of the side flanges of adjacently disposed segments of tunnel lining rings having similar varying inclinations.

8. A tapered tunnel lining segment formed of structural steel shapes with side and end edge flanges having true contact engaging surfaces when the segments and tunnel lining rings are secured together, comprising a skin plate having its opposite edges parallel to each other, side flanges each formed of a flanged bar attached to the inner surface of the parallel side edges of the skin plate, said flanged bars each having a web disposed in radial alignment to the center line of the tunnel and arranged to converge toward each other at one end of the segment with their outer surfaces disposed at varying inclinations for engagement with the outer surfaces of the side flanges of adjacent segments having similar varying inclinations, and end plates welded to the ends of the skin plate and the side flanges.

9. A tapered tunnel lining segment formed of structural steel shapes with side and end edge flanges having true contact engaging surfaces when the segments and tunnel lining rings are secured together, comprising a skin plate having its opposite side edges parallel to each other, side flanges formed of a bulb angle each having a web arranged at a converging angle to each other, said bulb angles having their bulbs attached to the inner side edges of the skin plate with their webs extending inwardly therefrom in radial alignment to the center line of the tunnel with their outer surfaces disposed at varying inclinations for engagement with the outer surfaces of the side flanges of adjacently disposed segments having similar varying inclinations, and end plates welded to the ends of the skin plate and the side flanges.

10. A tunnel lining segment formed of structural steel shapes with side and end edge flanges having true contact engaging surfaces when the segments and tunnel lining rings are secured together, comprising a skin plate having its opposite side edges of varying width, side flanges each formed of a bulb angle having its bulb attached to the inner side edge of the skin plate and the web extending inwardly therefrom the full length of the segment with its outer contact engaging surfaces extending radially to the center line of the tunnel, and end plates welded to the ends of the skin plate and the side flanges.

11. The method of forming a segment of structural shapes for a tunnel lining having a skin plate and separately formed inwardly extending side and end flanges having true face to face contact engaging surfaces when the tunnel segments and rings are secured together, which consists in assembling the skin plate and the side and end members forming the flanges clamped in contact with the edges of the skin plate and the outer faces of the side flanges clamped against cheek plates having their inner surfaces extending radially to the center line of the tunnel lining, and then welding the assembled shapes together.

12. The method of forming a tapered segment of structural shapes for a tunnel lining having a skin plate and separately formed inwardly extending side and end flanges having true face to face contact engaging surfaces when the tunnel segments and rings are secured together, which consists in assembling the skin plate and the side and end members forming the flanges clamped in contact with the edges of the skin plate and the outer faces of the side flanges clamped against cheek plates having their inner surfaces formed with varying inclinations extending radially to the center line of the tunnel lining, and then welding the assembled shapes together.

13. The method of forming a tapered segment of structural shapes for a tunnel lining having a skin plate and separately formed inwardly extending side and end flanges secured thereto, which consists in clamping the shapes forming the flanges of the segment in assembled relation in contact with the edges of the skin plate in a support, holding the outer surfaces of the shapes forming the side flanges against cheek plates having their inner surfaces with varying inclinations extending radially to the center line of the tunnel lining and the outer surfaces of the end flanges against the inner surfaces of end walls extending radially true to the center of the desired tunnel lining, and then welding the assembled shapes together.

14. The method of forming a tapered segment of structural shapes for a tunnel lining having a skin plate and separately formed side and end edge flanges secured together having true face to face contact engaging surfaces when the tunnel lining segments and rings are secured together, which consists in taking a skin plate, assembling a bulb angle to the opposite inner side edges of the skin plate with their webs extending inwardly and their outer surfaces engaging cheek plates having their inner surfaces formed with varying inclinations extending radially to the center line of the tunnel lining, applying a T-bar the same depth as the bulb angles centrally of the segment with the end of its stem engaging the inner surface of the skin plate, applying a plate to the opposite ends of said members to form the end flanges of the segment, clamping the shapes in a support in fixed relation to each other, and then welding the assembled shapes together.

15. The method of forming a tapered segment of structural shapes for a tunnel lining having a skin plate and separately formed side and edge flanges secured thereto having true face to face contact engaging surfaces when the tunnel lining segments and rings are secured together, consisting in taking a rectangular shaped skin plate having parallel side edges, forming the side flanges of the segment by applying an angular shaped bar to the opposite inner side edges of the plate arranged to converge toward each other at one end of the segment with the outer surfaces of the side flanges clamped against the inner surfaces of cheek plates disposed at varying inclinations and extending radially to the center line of the tunnel lining, forming the end flanges of the segment by applying a plate in contact relation with the opposite ends of the rectangular shaped skin plate and angular shaped bars, clamping the assembled shapes in a support in fixed relation to each other and then welding the assembled shapes together.

16. The method of forming a tapered segment of structural shapes for a tunnel lining having a skin plate and separately formed side and end edge flanges secured thereto having true face to face contact engaging surfaces when the tunnel lining segments and rings are secured together, consisting in taking a rectangular shaped skin plate having parallel side edges, applying a bar having a web and a flanged edge engaging the inner surface of each edge of the rectangular shaped skin plate with their webs extending inwardly and disposed at varying inclinations with their outer surfaces extending radially to the center line of the tunnel lining and converging toward each other at one end of the segment at an angle to allow the required welding area between the edges of the rectangular skin plate and the engaging flanges of the side bars, forming the end flanges of the segment by applying a plate in contact relation with the opposite ends of the rectangular skin plate and the ends of the bars, clamping the assembled shapes in a support in fixed relation to each other, and then welding the assembled shapes together.

17. The method of forming a segment of structural shapes for a tunnel lining having a skin plate and separately formed side and end edge flanges having true face to face contact engaging surfaces when the tunnel lining segments and rings are secured together, consisting in taking a plate having a varying width rolled in a universal mill adapted to form a skin plate, forming the side flanges of the segment by applying an angular shaped bar to the inner opposite side edges of the skin plate with the outer surfaces of the side flanges disposed at varying inclinations, clamping the outer surfaces of the side flanges against cheek plates having their inner surfaces with varying inclinations extending radially to the center line of the tunnel lining, forming the end flanges of the segment by applying an end plate in contact relation with the opposite ends of the skin plate and the angular shaped bars, clamping the assembled shapes in a support in fixed relation to each other, and then welding the assembled shapes together.

LEWIS FINE.
HARLEY B. KELCHNER.